United States Patent [19]
Hardee

[11] 3,987,577
[45] Oct. 26, 1976

[54] BOLL WEEVIL TRAP

[75] Inventor: Dicky D. Hardee, Starkville, Miss.

[73] Assignee: Story Chemical Corporation, Muskegon, Mich.

[22] Filed: July 8, 1975

[21] Appl. No.: 593,979

[52] U.S. Cl. .................................................. 43/121
[51] Int. Cl.[2] .......................................... A01M 1/02
[58] Field of Search ............. 43/121, 122, 118, 113, 43/107, 132, 124

[56] References Cited
UNITED STATES PATENTS

| | | | |
|---|---|---|---|
| 1,059,934 | 4/1913 | Dodard | 43/107 |
| 1,102,642 | 7/1914 | Brown | 43/122 |
| 1,178,076 | 4/1916 | Jefferis | 43/118 |

FOREIGN PATENTS OR APPLICATIONS

| | | | |
|---|---|---|---|
| 10,167 | 1890 | United Kingdom | 43/122 |

OTHER PUBLICATIONS

"Trap Plots For — Boll Weevils," Journal of Economic Entomology, Apr. 1974, pp. 281-283, W. P. Scott et al.
"Questions and Answers," Washington Post, Aug. 25, 1972, Tom Stevenson.

*Primary Examiner*—Warner H. Camp
*Attorney, Agent, or Firm*—Cooper, Dunham, Clark, Griffin & Moran

[57] ABSTRACT

A boll weevil trap comprises a support means, preferably colored or painted daylight fluorescent yellow, an open-ended hollow guiding means releaseably mounted on the upper end of said support means, perforated hollow trapping means detachably affixed at its open lower end to about the open upper end of said guiding means, said guiding means being adapted at about its open lower end to be releaseably affixed to the upper end of said support means to provide an annular space between the outside of said support means and the inside of the open lower end of said guiding means, the opening provided at the upper end of said guiding means being substantially smaller than the opening provided at the lower end of said guiding means, the opening at the upper end of said guiding means extending within the interior space of said trapping means. A method of attracting and collecting or trapping boll weevils employing the above-described boll weevil trap comprises placing the boll weevil trap in a location where boll weevils may be present, attracting the boll weevil to said trap by associating said trap with the male boll weevil aggregating pheromone, grandlure. When the boll weevil is attracted thereto by the combination of the daylight fluorescent yellow color of said trap and the pheromone, the boll weevil moves positively geotropically upwardly on said trap into a perforated collecting or trapping means provided at the upper location or end of said trap.

4 Claims, 9 Drawing Figures

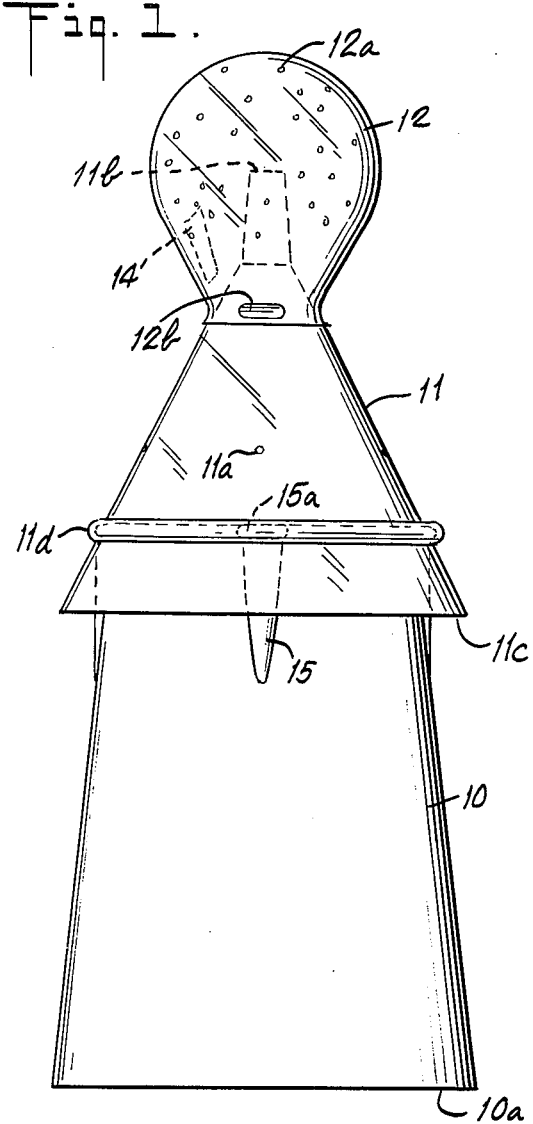
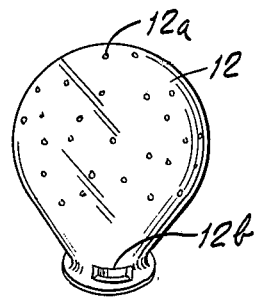
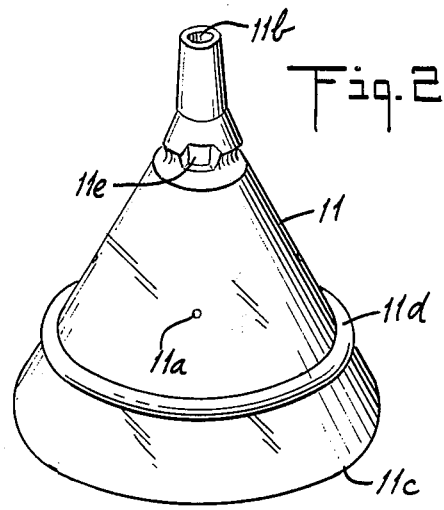
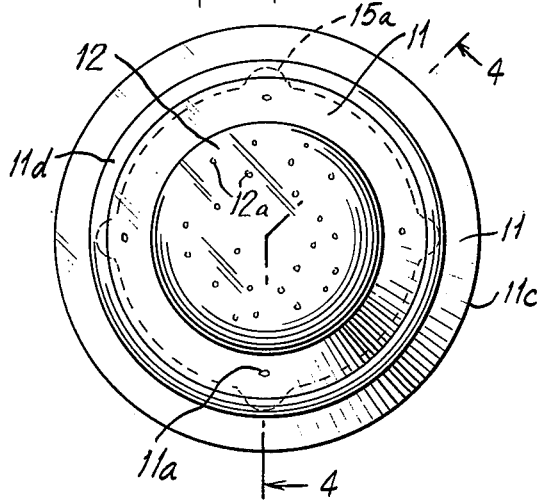
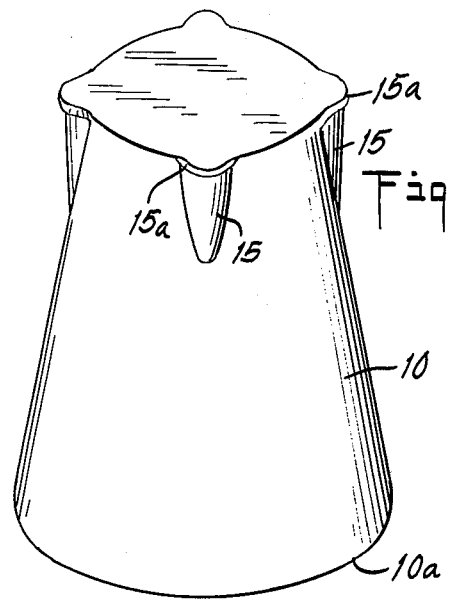

U.S. Patent  Oct. 26, 1976  Sheet 2 of 2  3,987,577
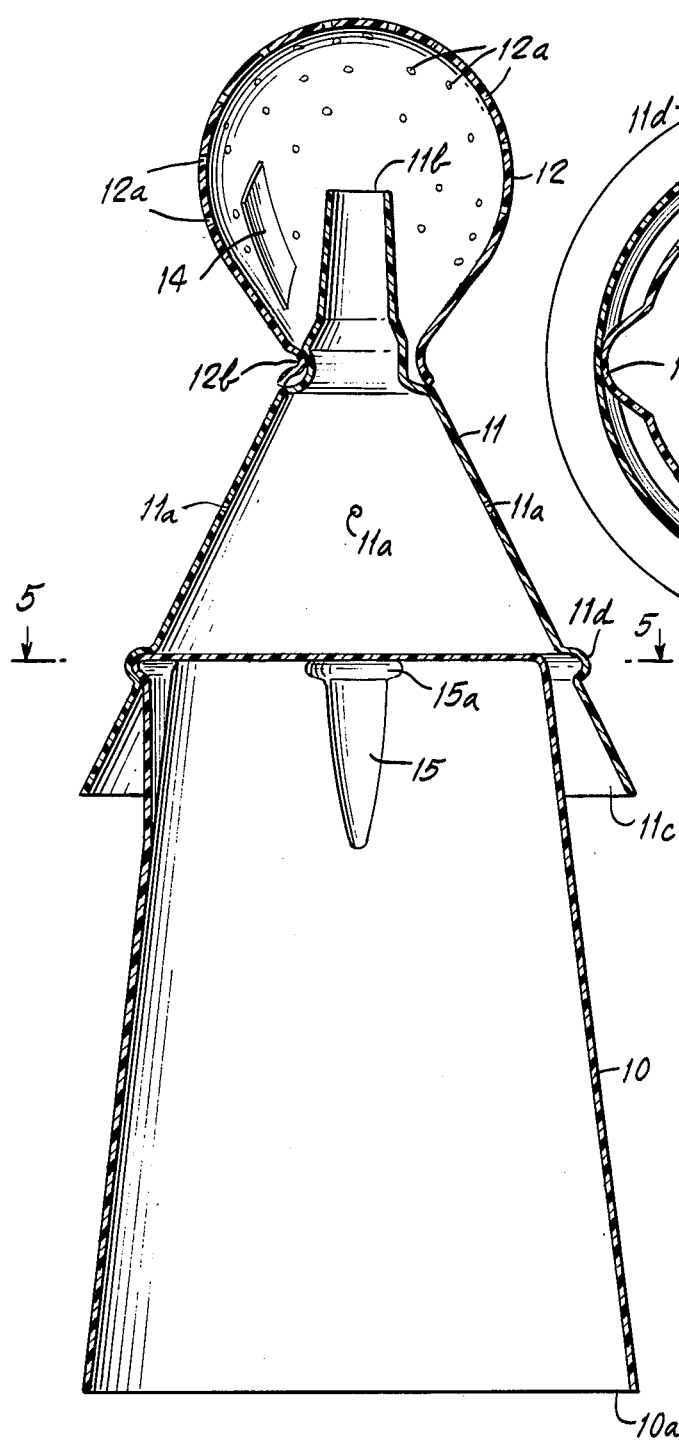
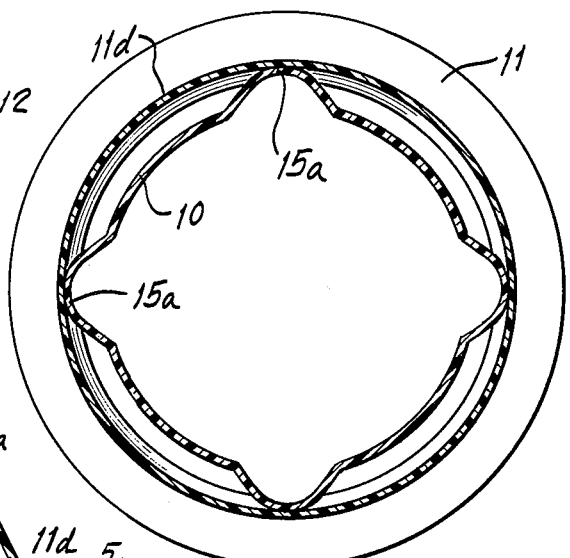
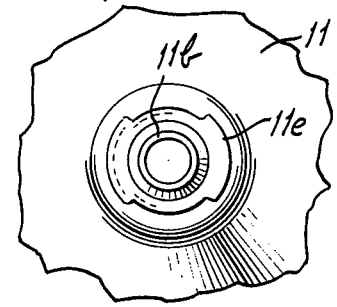
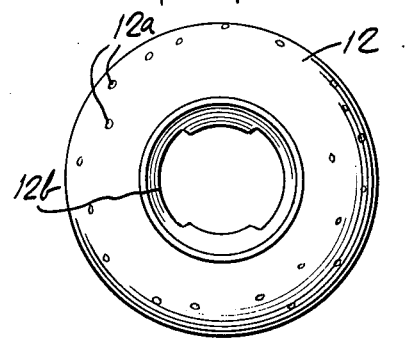

BOLL WEEVIL TRAP

This invention relates to boll weevils. More particularly, this invention relates to the control and/or trapping or collecting of boll weevils. In one embodiment this invention is directed to a method and apparatus for collecting or trapping boll weevils. In another embodiment this invention is useful for surveying land areas, particularly land areas planted for the growing of cotton to determine locations where boll weevils may be present. In still another embodiment this invention is directed to a method employing a boll weevil trap as described herein to concentrate boll weevils in a particular area so that the boll weevil as a pest can more readily be combatted.

The boll weevil has been described as being the most costly insect in the history of American agriculture. Losses in cotton production due to the boll weevil are estimated to average hundreds of millions of dollars annually and to prevent even greater losses cotton growers spend tens of millions of dollars each year on chemical pesticides for the control of the boll weevil, see U.S. Dept. Agr., Coop. Econ. Ins. Rpt. 22(14): 200–207, 1972.

Various techniques have been proposed for the better utilization of the chemical pesticides used to combat the boll weevil and various techniques have been proposed for combatting or irradicating the boll weevil. One technique proposed for combatting the boll weevil involves the use of the male boll weevil aggregating pheromone known as grandlure. In this technique an early planting of cotton in selected areas is carried out and material containing the male boll weevil aggregating pheromone, grandlure, is placed at these locations so as to attract and concentrate the boll weevil. Thereupon after a sufficient period of time to attract the boll weevil has elapsed, these crops are chemically treated with boll weevil pesticides so as to destroy the boll weevil. Thereupon, regular planting of the cotton crop is commenced. This technique of combatting the boll weevil is known as the "trap plot" technique, see the article by Scott et al entitled "Trapping Boll Weevils," published Journal of Economic Entomology, pages 281-283, Apr. 1974.

The disclosures of the above-identified publications are herein incorporated and made part of this disclosure.

For the most part, however, the apparatus and methods employed heretofore for combatting the boll weevil have not been completely successful.

It is an object of this invention to provide an improved boll weevil trap.

It is another object of this invention to provide a method for attracting, collection and/or trapping boll weevils.

How these and other objects of this invention are achieved will become apparent in the light of the accompanying disclosure made with reference to the accompanying drawings wherein:

FIG. 1 is a side view of the boll weevil trap in accordance with this invention;

FIGS. 2a, 2b and 2c are an exploded view of the boll weevil trap separately illustrating the three elements making up the boll weevil trap shown in FIG. 1;

FIG. 3 is a top view of the boll weevil trap shown in FIG. 1;

FIG. 4 is a vertical cross sectional view of the boll weevil trap taken along the line 4—4 of FIG. 3;

FIG. 5 is a horizontal cross sectional view taken along the line 5—5 of FIG. 4;

FIG. 6 is a fragmentary top view of the element of the boll weevil trap shown in FIG. 2b; and FIG. 7 is the bottom view of the element of the boll weevil trap shown in FIG. 2a of the drawings.

The boll weevil trap in accordance with this invention is illustrated in the accompanying drawings. Referring now to the drawings, there is illustrated therein, see FIG. 1, the assembled boll weevil trap. As illustrated in the drawings the boll weevil trap comprises a substantially frustum shape or truncated conical shape support member 10 to which is releasably affixed to a substantially conical shape or funnel shape guiding member 11, as illustrated, in inverted position, with the narrow or smaller opening 11b of guiding member 11 protruding into trapping or collecting member 12 of generally bulbous or spherical shape. Desirably, support member 10 is painted or colored daylight fluorescent yellow since that color tends to attract boll weevils. Guiding means or element 11 and trapping or collecting means or element 12 are preferably made of transparent plastic material, as illustrated. Trapping or collecting means 12 is provided with perforations 12a, as illustrated, to prevent the build-up of air pressure therein when the trap is exposed to sunlight. Similarly, guiding means 11 is provided with perforations 11a to better permit release of any hot air from the inside thereof. Perforations 11a and 12a are desirably smaller than the boll weevil to prevent the escape of the boll weevil through these perforations. If desired, support member 10 may be similarly perforated.

In accordance with one embodiment of the invention material 14 containing the male boll weevil aggregating pheromone, grandlure, is provided within trapping or collecting means 12, as illustrated in FIG. 1.

In use, the boll weevil trap as assembled and illustrated in FIG. 1, is placed in an area where the presence of boll weevils is suspected by simply pressing the open bottom end 10a of the assembled trap into the earth. The boll weevils would be attracted thereto by the bright daylight fluorescent yellow color of support 10 as well as by the molecules of the vaporized male boll weevil aggregating pheromone, grandlure, emanating from collecting or trapping means 12 via perforations 12a. As the boll weevils are attracted to the trap the boll weevils, because of their inherent biological characteristic of moving positively geotropically or upwardly along a surface, would move upwardly on the outside surface of support means 10 and within the annular space provided between the outside of support means 10 and the inside surface of guiding means 11 and then along the inside surface of guiding means or element 11 and through small narrow funnel opening 11b thereof into trapping means 12.

The annular space defined by the outside of support means 10 and the inside of guiding means 11 is provided by protuberances 15 provided on the upper end of support means 10. The upper end of protuberances 15 are provided with beveled edges 15a. A circular, peripheral groove 11d is provided on the inside of guiding means 11 and guiding means 11 is detachably fixed to the upper end of support means 10 by pressing the large lower open end 11c of guiding means 11 onto support means 10 until circular groove 11d of guiding means 11 snaps onto protruding beveled surfaces 15a of protuberances 15 at the upper portion of support means 10.

As the boll weevils move upwardly within the inside surface of guiding means 11 eventually the boll weevils exit the upper end of guiding means 11 via small opening 11b therein, guiding means 11 being substantially funnel shaped. As illustrated in the drawings, see particularly FIGS. 1 and 4, the upper end and opening 11b of guiding means 11 is positioned within bulbous trapping or collecting means 12. Since opening 11b is relatively small with respect to the volume of the space within bulbous collecting or trapping means 12 and since desirably there is present therein the male boll weevil aggregating pheromone, grandlure, the boll weevils entering trapping element 12 via opening 11b of guiding means 11 would congregate therein and, in effect, be trapped.

As illustrated in the drawings, collecting means 12 is detachably fixed to about the upper end of guiding means 11 by means of interrupted thread engagement 12b and 11e, respectively, whereby bulbous collecting or trapping member 12 may be quickly threadedly engaged and disengaged from the outside of the upper end of guiding element 11.

Various insect traps have been proposed heretofore, see U.S. Pat. No. 598,521 (1898) and U.S. Pat No. 3,824,734 (1974), but the traps proposed heretofore have been mechanically complicated and difficult to operate as compared with the boll weevil trap of this invention.

It has been indicated herein that trapping or collecting member 12 may have provided therein the material containing the male boll weevil aggregating pheromone, grandlure. A suitable carrier for this pheromone is provided by a three layer plastic laminate containing grandlure in the inner layer. Suitable such carrier material for grandlure is provided by the Hercon dispenser manufactured by the Herculite Protective Fabrics Corp., New York, N.Y., see U.S. Pat. No. 3,705,938. Such dispensing material would provide for the slow release of grandlure for a long period of time, a number of weeks.

In addition to the color of support means 10 the boll weevil would be attracted to the trap because of the vaporized molecules of the male boll weevil aggregating pheromone, grandlure, emanating from collecting or trapping element 12 via perforations 12a.

Desirably, as illustrated, guiding means 11 and trapping means 12 are made of clear transparent plastic material. One using the trap could readily determine the effectiveness of the trap by periodically visually inspecting the contents of the bulbous or sperical trapping element 12 and, if desired, the trapping element 12 could be removed and the boll weevils trapped therein counted. It is seen therefore that the boll weevil trap could be employed to run a survey to determine the presence and concentration of boll weevils within a given area where the traps are placed.

As will be apparent to those skilled in the art in the light of the foregoing disclosure, many modifications, alterations and substitutions are possible in the practice of this invention without departing from the spirit or scope thereof.

I claim:

1. Apparatus comprising support means, open-ended hollow guiding means releasably mounted on the upper end of said support means, perforated hollow trapping means detachably affixed at its open lower end to about the open upper end of said guiding means, said guiding means being adapted at about its open lower end to be releasably attached to the upper end of said support means to provide an annular space between the outside of said support means and the inside of the open lower end of said guiding means, the opening provided at the upper end of said guiding means being substantially smaller than the opening provided at the lower end of said guiding means, the opening at the upper end of said guiding means extending into said trapping means, said support means being frustum shaped and hollow and wherein the upper end of said support means is closed and its lower end is open, said support means being made of plastic material with the outside surface of the support means being colored or painted daylight fluorescent yellow, said guiding means and said trapping means being perforated and made of transparent plastic material, said guiding means being substantially funnel shaped with the smaller upper opening of said guiding means extending substantially within the interior of said hollow trapping means, said hollow trapping means being spherical or bulbous in shape and wherein material containing the male boll weevil aggregating pheromone, grandlure, is provided within the hollow interior space within said trapping means defined therein by the upper end of said guiding means extending within said trapping means and the inside surface of said trapping means.

2. Apparatus in accordance with claim 1 wherein the plastic material making up said support means, said guiding means and said trapping means in polyvinylchloride.

3. Apparatus in accordance with claim 1 wherein the plastic material making up said support means, said guiding means and said trapping means is polyethylene.

4. Apparatus in accordance with claim 1 wherein the plastic material making up said support means, said guiding means and said trapping means is polypropylene.

* * * * *